(12) United States Patent  (10) Patent No.: US 7,290,635 B2
Bisick et al.  (45) Date of Patent: Nov. 6, 2007

(54) WORK MACHINE OPERATOR CONTROL STATION WITH MOVEABLY ATTACHED CONTROLLER

(75) Inventors: Eric J. Bisick, Peoria Heights, IL (US); John P. Mackoway, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 384 days.

(21) Appl. No.: 10/884,767

(22) Filed: Jul. 2, 2004

(65) Prior Publication Data

US 2006/0000656 A1  Jan. 5, 2006

(51) Int. Cl.
*B60K 28/00* (2006.01)

(52) U.S. Cl. .................. 180/272; 180/286; 180/326; 180/329; 180/331

(58) Field of Classification Search ........... 180/272, 180/286, 326–331, 334, 900
See application file for complete search history.

(56) References Cited

U.S. PATENT DOCUMENTS

| | | | |
|---|---|---|---|
| 3,774,711 A | 11/1973 | Lacey | |
| 4,026,379 A | 5/1977 | Dunn et al. | |
| 4,055,230 A | 10/1977 | Kestian et al. | |
| 4,140,200 A * | 2/1979 | Tucek | 180/333 |
| 4,200,166 A | 4/1980 | Hansen | |
| 4,478,308 A | 10/1984 | Klaassen | |
| 4,646,869 A | 3/1987 | Kerner, Jr. | |
| 4,702,520 A | 10/1987 | Whisler et al. | |
| 4,730,691 A | 3/1988 | Grigg | |
| 5,086,869 A | 2/1992 | Newbery et al. | |
| 5,406,778 A | 4/1995 | Lamb et al. | |
| 5,566,778 A | 10/1996 | Valier et al. | |
| 5,924,515 A | 7/1999 | Stauffer | |
| 5,961,179 A | 10/1999 | Dixon et al. | |
| 5,971,434 A * | 10/1999 | Neufeld et al. | 280/756 |
| 6,039,141 A | 3/2000 | Denny | |
| 6,148,688 A | 11/2000 | Nishimaki | |
| 6,164,285 A * | 12/2000 | Garberg et al. | 180/326 |
| 6,182,781 B1 * | 2/2001 | Beom | 180/271 |
| 6,431,303 B1 * | 8/2002 | Muraro | 180/272 |
| D463,459 S | 9/2002 | Tamaru et al. | |
| 6,450,278 B1 * | 9/2002 | Shirogami et al. | 180/69.21 |
| 6,550,560 B2 * | 4/2003 | Carleton | 180/272 |
| 6,643,577 B1 | 11/2003 | Padgett et al. | |
| 7,014,255 B2 * | 3/2006 | Amamiya et al. | 296/190.08 |
| 2004/0099461 A1 * | 5/2004 | Miller et al. | 180/272 |

* cited by examiner

*Primary Examiner*—Eric Culbreth
(74) *Attorney, Agent, or Firm*—Liell & McNeil

(57) ABSTRACT

Engineers have been seeking strategies to improve a work machine operator's comfort and to ensure the operator's safety. The present disclosure includes an operator control station that includes a seat assembly supported, in part, on a suspension system. At least one work machine operation controller is pivotably attached to the seat assembly between an egress position and a work machine operation position. A locking mechanism is operable to fix the work machine operation controller in the work machine operation position.

18 Claims, 4 Drawing Sheets

WORK MACHINE OPERATOR CONTROL STATION WITH MOVEABLY ATTACHED CONTROLLER

TECHNICAL FIELD

The present disclosure relates generally to operator control stations for work machines, and more specifically to a method for preparing a work machine for operation via an operator control station.

BACKGROUND

In several relatively new work machines, work machine operation controllers are attached to an operator's seat, rather than to a work machine body. By attaching the controllers to the seat, the work machine operator's comfort is improved, which in return, can improve the operator's productivity. For instance, many work machines are operated on relatively rough ground, causing vibrations that can shake the operator. A vibration path back to the operator is dampened by removing the controls from a console attached to the work machine body and mounting them on the operator's seat above a seat suspension. Moreover, European regulations limit the amount of vibration allowed to the operator.

Because operators must egress to and from the operator's seat and operators are of various sizes, controllers attached to the operator's seat are preferably moveable with respect to the seat. For instance, the operator seat designed for an agricultural tractor set forth in U.S. Pat. No. 5,566,778 issued to Valier et al., on Oct. 22, 1996, includes controllers that are attached to an arm rest that is moveable in various directions. In order to provide egress to and from the operator's seat, the arm rest can be moved between a vertical and horizontal position via a friction articulated joint. In order to enhance the operator's comfort, the arm length and angle of the arm rest with the controllers can also be adjusted.

Although the Valier operator seat may provide the operator with the ability to adjust the position of the work machine operation controllers in order to enhance the operator's comfort, the Valier arm rest may not be adequately robust for use in many work machines that operate under relatively rough conditions. For instance, when operating a work machine along the side of a hill, a slant of the hill will cause the operator to put the operator's weight partly on the arm rest with the controllers in order to keep himself in an upright position. Thus, the arm rest, and possibly the controllers, must be sufficiently strong to withstand a relatively large lateral load. Moreover, it is important that the operator feel secure that the arm rest will support the operator's weight. Further, because the Valier arm rest is secured into position by the friction articulated joint rather than being securely locked into a work machine operation position, the arm rest may vibrate or backlash due to the vibrations caused by rough terrain. Both the lack of strength and stiffness in the arm rest can adversely affect the operator's comfort, safety, and performance.

The present disclosure is directed at overcoming one or more of the problems set forth above.

SUMMARY OF THE DISCLOSURE

In one aspect of the present disclosure, a work machine includes a work machine body to which an operator control station with a seat assembly is attached via a suspension system. At least one work machine operation controller is pivotably attached to the seat assembly between a work machine operation position and an egress position. A locking mechanism is operable to fix the at least one work machine operation controller in the work machine operation position.

In another aspect of the present disclosure, an operator control station includes a seat assembly supported, in part, on a suspension system. At least one work machine operation controller is pivotably attached to the seat assembly, and is moveable between an egress position and a work machine operation position. A locking mechanism is operable to fix the at least one work machine operation controller in the work machine operation position.

In yet another aspect of the present disclosure, a work machine is prepared for operation by pivoting an arm rest including at least one work machine operation controller to a work machine operation position. The arm rest is locked in the work machine operation position.

DETAILED DESCRIPTION

Figure 1:
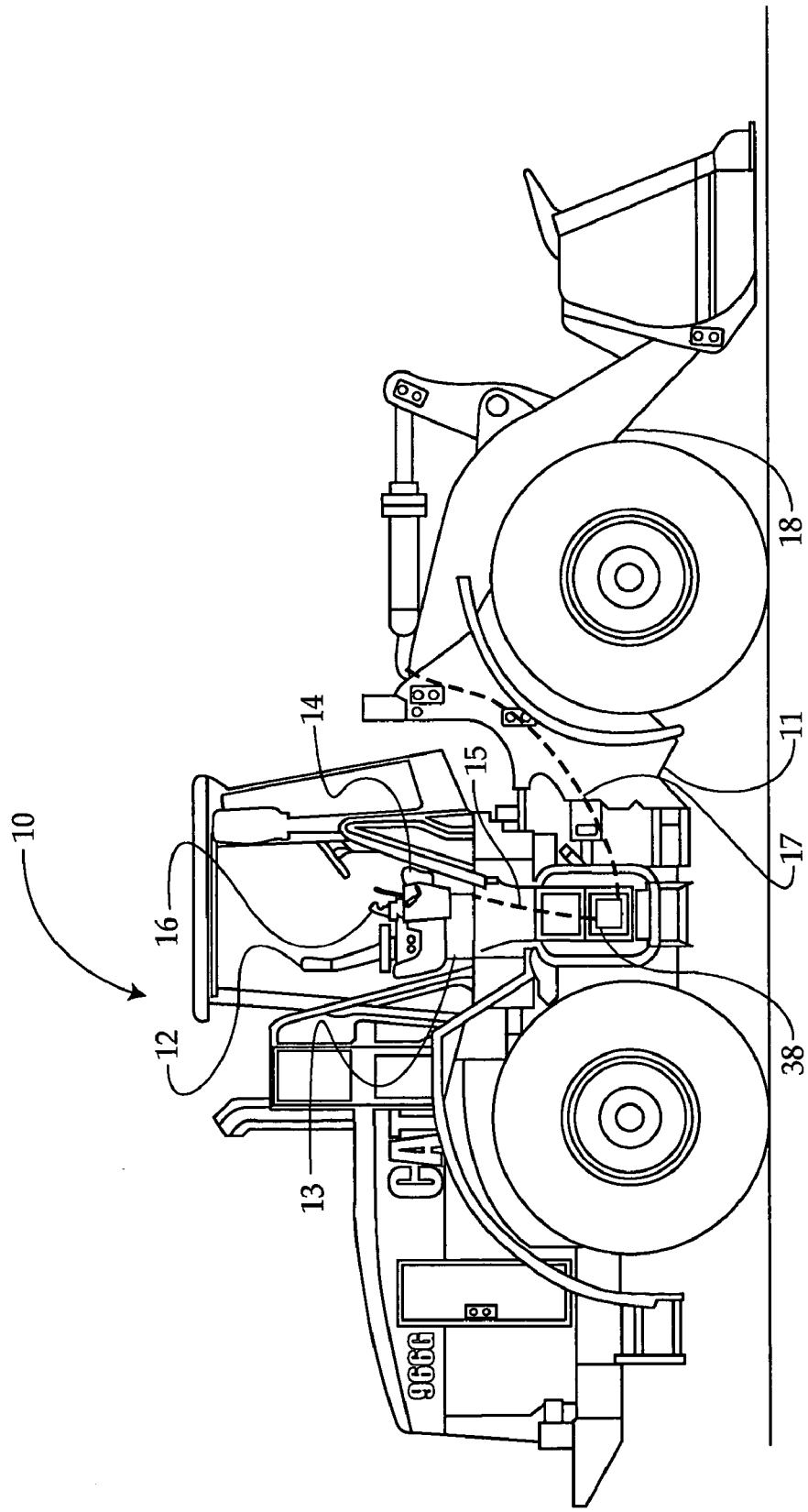
FIG. 1 is a side diagrammatic view of a work machine, according to the present disclosure.

Referring to FIG. 1, there is shown a side view of a work machine 10, according to the present disclosure. Although the work machine 10 is illustrated as a wheel loader, it should be appreciated that the present disclosure can find application in various types of work machines. The wheel loader 10 includes a work machine body 11 to which an operator control station 12 including a seat assembly 14 is attached via a suspension system 13. The present disclosure contemplates any type of shock-absorbing suspension system known in the art that can isolate the operator from vibrations. A work machine operation controller 16 is pivotably attached to the operator control station 12, although the present disclosure contemplates any number of work machine operation controllers being pivotably attached to the operator control station 12. The work machine operation controller 16 is in electrical communication via a controller communication line 15 with an electronic control module 38, which in return, is in communication with an implement, illustrated as a loader 18, via a loader communication line 17. Thus, an operator can control the movement of the loader 18 by manipulating the work machine operation controller 16 attached to the operator control station 12.

Figure 2:
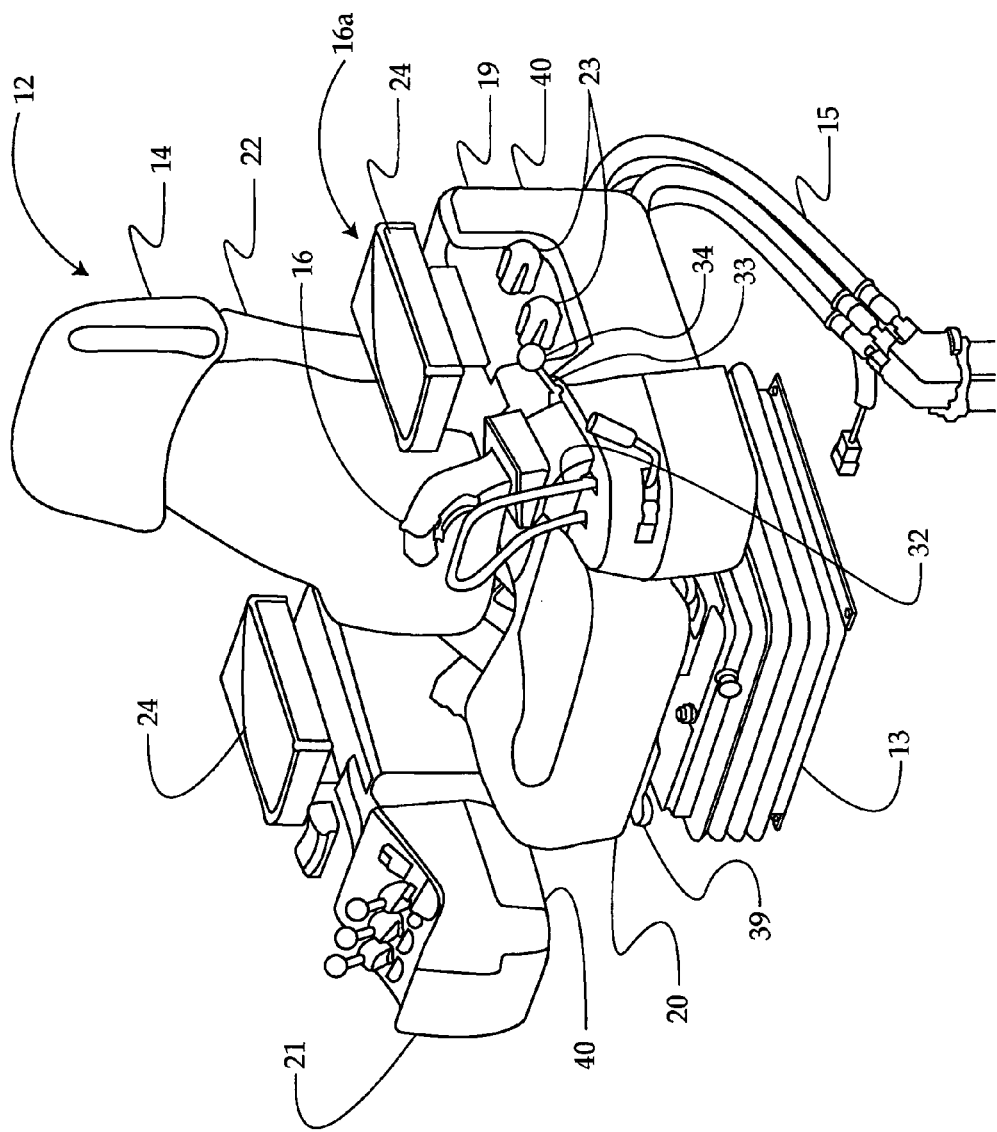
FIG. 2 is a perspective diagrammatic view of an operator control station from the work machine of FIG. 1.

Referring to FIG. 2, there is shown a perspective view of the operator control station 12 within the work machine 10 of FIG. 1. The seat assembly 14 includes a seat assembly frame 39 to which a first arm rest 19, a second arm rest 21, a seat 20 and a back 22 are attached. The first and second arm rests 19 and 21 include cushioned housings 40. A work machine operation controller 16 is attached to move with a portion of the first arm rest 19 between a work machine operation position 16a (as shown) and an egress position 16b (shown in FIG. 3). A handle 32 is attached to the arm rest 19 in order to aid the operator in moving the arm rest 19 between the positions 16a and 16b. Although the work machine operation controller 16 is preferably attached to the arm rest 19, it should be appreciated that the work machine operation controller 16 could be pivotally attached to the seat assembly 14 at various other locations, such as to the back 22 of the seat assembly 14.

The work machine operation controller 16 is illustrated as a joystick operable to move the loader 18. Various other work machine operation controllers, including, but not limited to, an implement lockout, a horn, a payload control system store, a throttle lock, and a throttle release, are attached to the second arm rest 21. Although only the first arm rest 19, and thus, work machine operation controller 16, are illustrated as being pivotably attached to the seat assembly 14, the present disclosure contemplates both arm rests 19 and 21, and thus the attached work machine operation controllers, being pivotably attached to the seat assembly 14. Both arm rests 19 and 21 are illustrated as including an adjustable arm support 24 and two arm support control knobs 23. Each arm support 24 can be raised and lowered, and then locked into a desired height by manipulating the respective arm support control knobs 23.

Figure 3:
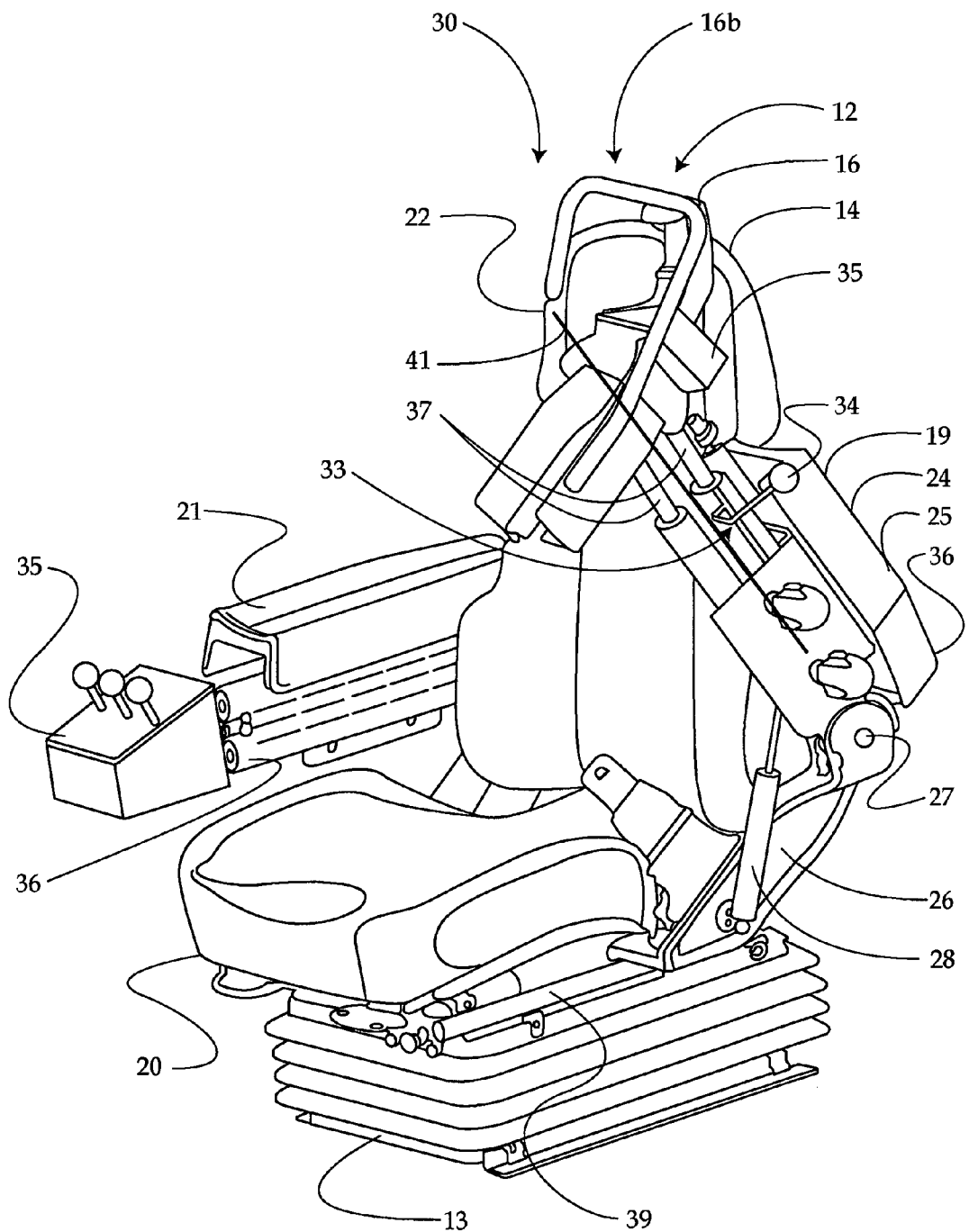
FIG. 3 is a perspective diagrammatic view of the operator control station of FIG. 2 with an arm rest in an egress position.
Figure 4:
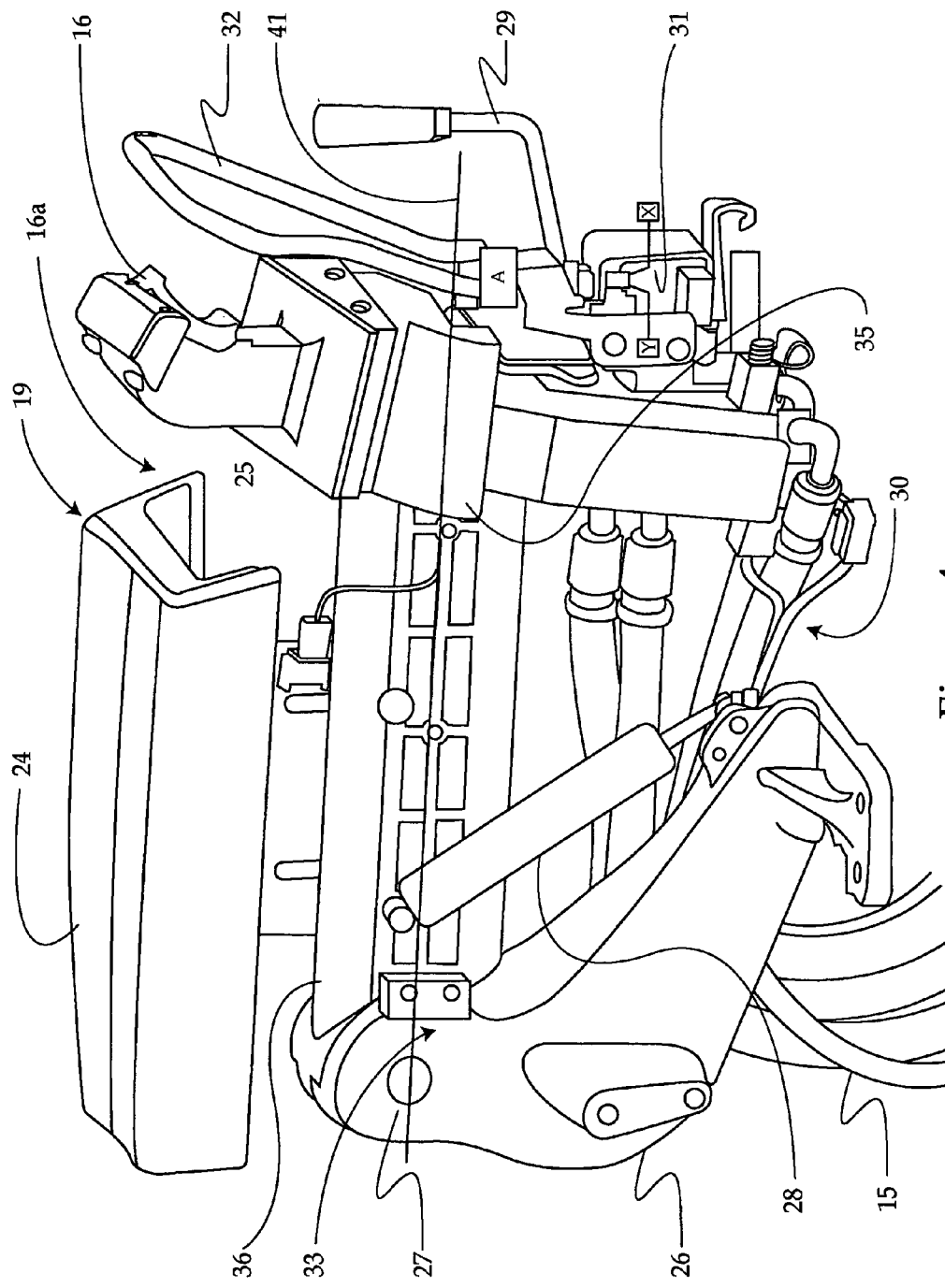
FIG. 4 is a side diagrammatic view of the arm rest of FIG. 3 locked in a work machine operation position.

Referring in addition to FIG. 3, there is shown a perspective view of the operator control system 12 with the arm rest 19 in the egress position 16*b*. The arm rest 19 is illustrated without the cushioned housing 40 in order to illustrate an internal mechanism 30 of the arm rest 19. The arm rest 19 includes two portions, being a moveable portion 25 and a stationary portion 26 with regard to the seat 20 of the seat assembly 14. The stationary portion 26 can be securely attached to the seat 20 through various methods, such as bolting the stationary portion 26 to the seat assembly frame 39. The moveable portion 25 is attached to the stationary portion 26 via pin 27, and is constrained to pivot only about the pin 27. Thus, the moveable portion 25 can pivot up towards the egress position 16*b* (as shown) and return downwards to the work machine operation position 16*a* (as shown in FIGS. 2 and 4), but cannot pivot outwardly away from the seat 20. The egress position 16*b* is any position out of the work machine operation position 16*a* which provides the operator with an egress path to and from the operator control station 12. Although not illustrated in FIG. 3, the egress position 16*b* preferably includes a maximum egress position in which the work machine operation controller 16 is separated from the work machine operation position 16*a* by an angle greater than 90° such that arm rest 19 is roughly parallel to seat back 22.

A spring assembly 28 is operably positioned between the stationary portion 26 and the moveable portion 25. When the arm rest 19, and thus the work machine operation controller 16, is in the work machine operation position 16*a*, the spring assembly 28 is compressed. Preferably, the moveable portion 25 and the stationary portion 26 are castings that are comprised of heat-treated aluminum. Those skilled in the art will appreciate that the portions 25 and 26 could be made from any material that can provide sufficient strength in order to carry the load of an operator leaning on the arm rest 19 for support and provide the leaning operator with a secure feeling that the arm rest and attached controller(s) will not break or collapse. However, the material comprising the castings 25 and 26 must be light enough that it does not adversely affect, or collapse, the seat suspension 13.

Referring still to FIG. 3, the arm rests 19 and 21 are also preferably adjustable along a line 41 among a plurality of arm length positions. Although the present disclosure contemplates various methods of adjusting the arm rests 19 and 21 among the plurality of arm length positions, in the illustrated example, the moveable portion 25 is separated into a control section 35 and an arm support section 36. The control section 35 can be moved backwards and forward with respect to the arm support section 36. The work machine operation controllers, including controller 16, are attached to the control sections 35, and the arm supports 24 are attached to the arm support sections 36. In the illustrated example, two moveable shafts 37 extend between the arm support section 36 and the control section 35. The shafts 37 slide within bores defined by the arm support section 36. The control section 35 is operably coupled to move with the sliding shafts 37. At least one of the shafts 37 define arm position bores (not shown) separated by a predetermined distance. Each arm position bore correlates to a different arm length position. Although the predetermined distance between the arm position bores can vary, the predetermined distance is a distance which can provide a sufficient number of discrete arm length positions to accommodate operators of various arm lengths. In the illustrated example, the predetermined distance is one half of an inch. A spring loaded pin (not shown) is moveable in and out of the arm position bores. When the spring loaded pin is in a first position and aligned with one of the arm position bores, the spring loaded pin extends into one of the arm position bores. An arm length position release (not shown) is operable to move the spring loaded pin into the second position so the operator can adjust the distance between the control section 35 and the support section 36. When the spring loaded pin is unaligned with the arm position bores, the spring loaded pin is in pushed into the second position against the bias of the spring by the shaft body.

Referring to FIG. 4, there is shown a side view of the arm rest 19 in the work machine operation position 16*b*. Similar to FIG. 3, the cushioned housing 40 is removed to illustrate the internal mechanism 30 of the arm rest 19. The seat assembly 14 includes a locking mechanism 33 that is operable to fix the work machine operation controller 16 in the work machine operation position 16*a*. The locking mechanism 33 includes a spring loaded rod (not shown) running through the moveable portion 25 When the arm rest 19 is in the work machine operation position 16*a* (as shown), the rod is biased into a first position and aligned with a rod bore (not shown) within the stationary portion 26. In the first position, the rod extends between the moveable portion 25 and into the rod bore of the stationary portion 26. The locking mechanism 33 also includes an operator lock release 34 (shown in FIG. 3) that is operable to move the spring loaded rod to a second position in which the rod does not extend into the rod bore. When the work machine operation controller 16 is out of the work machine operation position 16*a*, the spring loaded rod remains in the second position and is out of alignment with the rod bore.

In order to move the arm rest 19 out of the work machine operation position 16*a*, a lever 29 that is moveable between an inoperable and an operable position (as shown) is in the inoperable position. The lever 29 is operably coupled to a switch 31. When the lever 29 is in the operable position, the switch 31 permits electrical communication between the electronic control module and the controller 16. However, when the lever 29 is in the inoperable position, the switch disables the controller 16 by breaking communication between the electronic control module 38 and the controller 16. Thus, when the arm rest 19, and thus, the attached work machine operation controller 16, is not in the work machine operation position 16*a*, the work machine operation controller 16 is inoperable. Those skilled in the art will appreciate that there are various other methods of making the controller 16 inoperable, including, but not limited to, programming the electronic control module to de-activate the controller when it receives a signal indicating that the arm rest is in the egress position.

INDUSTRIAL APPLICABILITY

Referring to FIGS. 1-4, a method of preparing the wheel loader 10 for operation will be discussed. Although the operation of the present disclosure will be discussed for the operator control station 12 within the illustrated wheel loader 10, the present disclosure operates similarly for an operator control station in any work machine. In order to egress to and from the operator control station 12, the operator can move the arm rest 19, and thus the work machine operation controller 16, to the egress position 16b (shown in FIG. 3). In order to move the arm rest 19 to the egress position 16b, the operator must first move the lever 29 to the inoperable position in which the switch 31 coupled to the lever 29 breaks the communication between the electronic control module 38 and the controller 16. Because the work machine operation controller 16 is inoperable, if the operator were to accidentally move the controller 16 by slipping and falling during egress to and from the operator control station 12, the operator would not activate the wheel loader 10. Moreover, those skilled in the art will appreciate that the controller 16 is designed such that the weight of a falling operator on the controller 16 should not disable the controller 16. After the controller 16 is inoperable, the operator can pull on the operator lock release in order to move the spring loaded rod (not shown) to the second position, which is out of the rod bore. When the spring loaded rod is in the second position, the operator can use the handle 32 to lift the arm rest 19 out of the work machine operation position 16a. The spring loaded rod will remain out of position with the rod bore and in the second position while the work machine operation controller 16 is out of the work machine operation position 16a.

When the arm rest 19 is in the egress position 16b, there is room for the operator to access the operator control station 12 without making contact with the work machine controller 16, thereby increasing the operator's comfort and safety. Moreover, the operator can move the arm rest 19, and the work machine operation controller 16, to the maximum egress position which is greater than 90° from the work machine operation position 16a. Thus, if the spring assembly 28 were to break while the work machine operation controller 16 was in the maximum egress position, gravity will help prevent the arm rest 19 and controller 16 from falling toward the work machine operation position 16a.

Once the operator is seated in the seat assembly 13, the operator can use the handle 32 to move the arm rest 19, and thus the work machine operation controller 16, to the work machine operation position 16a. The arm rest 19 including the work machine operation controller 16 will pivot about the pin 27 to the work machine operation position 16a. When the arm rest 19 is in the work machine operation position 16a, the spring loaded rod of the locking mechanism 33 will align with the rod bore within the stationary portion 26 of the arm rest 19. When aligned, the spring loaded rod will extend between the stationary portion 26 and the moveable portion 25 of the arm rest 19, thereby securing the arm rest 19 in to the work machine operation position 16a. Because the arm rest 19 and work machine operation controller 16 are locked into the work machine operation position 16a by the locking mechanism 33, any backlash or movement between the arm rest 19 and the seat 20 during the operation of the wheel loader 10 is reduced, if not eliminated.

Once the operator has positioned himself within the operator control station 12 and has locked the arm rest 19 into the work machine operation position 16a, the operator can preferably adjust the work machine operation controller 16 to the operator's desired arm length position. The operator can move the control section 35 of the arm rest 19 relative to the seat 20 and the arm support section 36 to the desired arm length position. Although there are various methods of adjusting the control section 35 forwards and backwards, in the illustrated example, the operator can pull on the controller position lock release (not shown) that will move the spring loaded pin from one of the arm position bores within one of the shafts 37, allowing the operator to pull the control section 35 coupled to move with the shafts 37 forward and backwards. Once the control section 35 is at the operator's arm length position, the operator can release the controller position lock release. The pin will reinsert itself within one of the arm bores in order to lock the control section 35 at the desired arm length position. Further, preferably the operator can adjust the height of the arm support 24 by manipulating the arm support 24 and the arm support control knobs 23. The operator can make similar adjustments to the control section 35 and arm support 24 of the arm rest 21.

Once the operator control station 12 is adjusted for the particular size of the operator, the operator can begin work machine operation. During operation, the wheel loader 10 may operate over rough terrain. Because the work machine operation controller 16 is attached to the seat assembly 13 above the seat suspension 13, a vibration path to the operator through the work machine operation controller 16 is reduced, or even eliminated. Moreover, because the arm rest 19 is locked into the work machine operation position 16a, the arm rest 19 will not move relative to the seat 20 due to the rough terrain. In addition, the operator may be required to operate the wheel loader 10 at an angle, such as on the side of a hill. Because the moveable and stationary portions 25 and 26 are castings made from heat-treated aluminum, the arm rests 19 and 21 are sufficiently strong to withstand the lateral load of the operator and provide the leaning operator with a secure feeling. However, the castings are light enough that they do not place excessive weight on the seat suspension 13.

The operator control station 12 of the present disclosure is advantageous because it provides operator safety and comfort, that in return, provides increased operator productivity. The present disclosure provides the operator with the ability to adjust the operator control station 12 to fit his or her size while also limiting the undesirable movement of the seat assembly 14. In order to isolate the operator from vibrations caused by the operation of the wheel loader 10, the work machine operation controllers are attached to the arm rests 19 and 21, and the seat suspension 13 is operably positioned between the arm rests 19 and 21 and the work machine body 11. In order to reduce the movement or back lash of the arm rest 19 relative to the seat 20 of the seat assembly 14 during operation of the wheel loader 10, the pivoting action of the moveable portion 25 is limited between the work machine operation position 16a and the egress position 16b, and the arm rest 19 locks into the work machine operation position 16a. In order to ensure the operator's safety while leaning on the arm rests 19 and 21 for support during operation of the wheel loader 10 at an angle, the present disclosure includes sturdy arm rests 19 and 21 made from heat-treated aluminum castings.

The present disclosure also provides the operator with the ability to adjust the operator control station 12 to fit his or her size. The operator can adjust the arm rest 19 and 21 so that the work machine controllers, including controller 16, are located at the arm length position corresponding to the operator's arm length. Further, the operator can adjust the height of the arm supports 24, and pivot the moveable portion 25 of the arm rest 19 up and down in order to provide a path for egress to and from the operator control station 12. Although the present disclosure illustrates only arm rest 19 being moveable about the pin 27, the present disclosure contemplates both arm rests being moveable between the work machine operation position 16a and the egress position 16b.

It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. A work machine comprising:
 a work machine body;
 an operator control station including a seat assembly, which includes first and second arm rests adjacent opposite sides of a seat and back, being attached to the work machine body via a suspension system;
 at least one work machine operation controller being pivotably attached to the seat assembly to move with a portion of the first arm rest between a work machine operation position and an egress position about a pivot;
 a locking mechanism being operable to fix the at least one work machine operation controller in the work machine position;
 a spring assembly operably coupled between a stationary portion of the seat assembly and a pivoting portion of the first arm rest, and the spring assembly being compressed when the first arm rest is in the work machine operation position; and
 the egress position being separated from the work machine operation position by an angle greater than 90°.

2. The work machine of claim 1 wherein the portion of the first arm rest being adjustable along a line among a plurality of arm length positions via a shaft that slides along its length into a bore.

3. A work machine comprising:
 a work machine body;
 an operator control station including a seat assembly, which includes first and second arm rests adjacent opposite sides of a seat and back, being attached to the work machine body via a suspension system;
 at least one work machine operation controller being pivotably attached to the seat assembly to move with a portion of the first arm rest between a work machine operation position and an egress position about a pivot;
 a locking mechanism being operable to fix the at least one work machine operation controller in the work machine position;
 wherein the at least one work machine operation controller being inoperable when in the egress position; and
 wherein a switch disconnects communication between the work machine operation controller and an electronic control module when the locking mechanism is moved to an unlocked position.

4. The work machine of claim 3 including a spring assembly operably coupled between a stationary portion of the seat assembly and a pivoting portion of the first arm rest, and the spring assembly being compressed when the first arm rest is in the work machine operation position.

5. The work machine of claim 3 wherein the moveable portion of the first arm rest is constrained to pivot up and down only about the pin.

6. The work machine of claim 5 wherein the locking mechanism includes a spring-loaded rod biased to a first position, and an operator lock release being operable to move the spring loaded rod to a second position; and
 when the work machine operation controller is in the work machine operation position, the spring-loaded rod is aligned with a rod bore and is in the first position, and when the work machine operation controller is in the egress position, the spring loaded rod is out of alignment with the rod bore and is in the second position.

7. The work machine of claim 6 wherein a stationary portion of the seat assembly and the moveable portion being castings including heat-treated aluminum.

8. A work machine comprising:
 a work machine body;
 an operator control station including a seat assembly being attached to the work machine body via a suspension system;
 at least one work machine operation controller being pivotably attached to the seat assembly between a work machine operation position and an egress position;
 a locking mechanism being operable to fix the at least one work machine operation controller in the work machine position;
 the seat assembly includes at least one arm rest;
 the at least one work machine operation controller being attached to move with at least a portion of the arm rest;
 the seat assembly includes a seat;
 the arm rest includes a moveable portion attached via a pin to a stationary portion with regard to the seat;
 the moveable portion constrained to pivot only about the pin;
 wherein the locking mechanism includes a spring-loaded rod biased to a first position, and an operator lock release being operable to move the spring loaded rod to a second position;
 when the work machine operation controller is in the work machine operation position, the spring-loaded rod is aligned with a rod bore and is in the first position, and when the work machine operation controller is in the egress position, the spring loaded rod is out of alignment with the rod bore and is in the second position;
 wherein the stationary portion and the moveable portion being castings including heat-treated aluminum;
 wherein the egress position being separated from the work machine operation position by an angle greater than 90°;
 at least a section of the moveable portion of the arm rest being adjustable along a line among a plurality of arm length positions;
 the at least one work machine operation controller being inoperable when in the egress position; and
 the work machine being a wheel loader.

9. An operator control station comprising:
 a seat assembly, which includes first and second arm rests adjacent opposite sides of a seat and back, supported, in part, on a suspension system;
 at least one work machine operation controller being pivotably attached to seat assembly to move with a portion of the first arm rest between an egress position and a work machine operation position about a pivot;
 a locking mechanism being operable to fix the at least one work machine operation controller in the work machine operation position;
 a spring assembly operably coupled between a stationary portion of the seat assembly and the pivoting portion of the first arm rest, and the spring assembly being compressed when the first arm rest is in the work machine operation position;

a switch that disconnects communication with the work machine operation controller when the locking mechanism is moved to an unlocked position.

10. The operator control station of claim 9 wherein the locking mechanism includes a spring-loaded rod biased to a first position, and an operator lock release being operable to move the spring loaded rod to a second position, which is the unlocked position; and when the work machine operation controller is in the work machine operation position, the spring-loaded rod is aligned with a rod bore and is in the first position, and when the work machine operation controller is in the egress position, the spring loaded rod is out of alignment with the rod bore and is in the second position.

11. An operator control station comprising:

a seat assembly supported, in part, on a suspension system;

at least one work machine operation controller being pivotably attached to seat assembly between an egress position and a work machine operation position;

a locking mechanism being operable to fix the at least one work machine operation controller in the work machine operation position;

the seat assembly includes at least one arm rest; and the at least one work machine operation controller being attached to move with at least a portion of the arm rest;

the seat assembly includes a seat;

the arm rest includes a moveable portion attached via a pin to a stationary portion with regard to the seat;

the moveable portion constrained to pivot only about the pin;

wherein the locking mechanism includes a spring-loaded rod biased to a first position, and an operator lock release being operable to move the spring loaded rod to a second position;

when the work machine operation controller is in the work machine operation position, the spring-loaded rod is aligned with a rod bore and is in the first position, and when the work machine operation controller is in the egress position, the spring loaded rod is out of alignment with the rod bore and is in the second position; and at least a section of the moveable portion being adjustable along a line among a plurality of arm length positions.

12. The operator control station of claim 11 including a spring assembly operably coupled between a stationary portion of the seat assembly and the moveable portion of the at least one arm rest, and the spring assembly being compressed when the at least one work machine controller is in the work machine operation position.

13. The operator control station of claim 11 wherein the egress position being separated from the work machine operation position by an angle greater than 90°; and the at least one work machine operation controller being inoperable when in the egress position.

14. The operator control station of claim 13 wherein the stationary portion and the moveable portion being castings including heat-treated aluminum.

15. A method of preparing a work machine for operation, comprising the steps of:

pivoting an arm rest including at least one work machine operation controller downward against the action of a spring assembly from an egress position to a work machine operation position;

locking the arm rest in the work machine operation position by moving a locking mechanism to a locked position; and the locking step includes enabling communication between the work machine operation controller and an electronic control module of the work machine.

16. The method of claim 15 wherein the step of locking the at least one work machine operation controller into the work machine operation position includes a step of extending a spring-loaded rod between a stationary portion and a moveable portion of an arm rest.

17. The method of claim 15 wherein the step of preparing includes a step of adjusting the work position of the work machine operation controller, at least in part, by moving at least a portion of the arm rest relative to a seat of the seat assembly for a predetermined arm length.

18. The method of claim 15 wherein the step of pivoting includes a step of constraining the pivoting about a pin attaching a moveable portion of the arm rest to a stationary portion of the arm rest.

* * * * *

UNITED STATES PATENT AND TRADEMARK OFFICE
CERTIFICATE OF CORRECTION

| | |
|---|---|
| PATENT NO. | : 7,290,635 B2 |
| APPLICATION NO. | : 10/884767 |
| DATED | : November 6, 2007 |
| INVENTOR(S) | : Bisick et al. |

It is certified that error appears in the above-identified patent and that said Letters Patent is hereby corrected as shown below:

In Column 9, Lines 26-27, in Claim 11, delete "operation controller in the work machine operation position;" and insert the same on line 25 after "machine".

In Column 10, Line 7, in Claim 12, after "machine" insert -- operation --.

Signed and Sealed this

Fifteenth Day of July, 2008

JON W. DUDAS
*Director of the United States Patent and Trademark Office*